United States Patent [19]

Brand

[11] Patent Number: 5,323,820

[45] Date of Patent: Jun. 28, 1994

[54] FUEL SPILLAGE CONTROL APPARATUS

[76] Inventor: Randolf W. Brand, P.O. Box 80828, Fairbanks, Ak. 99708

[21] Appl. No.: 47,918

[22] Filed: Apr. 19, 1993

Related U.S. Application Data

[63] Continuation-in-part of Ser. No. 10,080, Jan. 28, 1993, Pat. No. 5,255,721, which is a continuation-in-part of Ser. No. 638,322, Jan. 7, 1991, Pat. No. 5,186,222.

[51] Int. Cl.$^5$ ............................ F16L 5/00; B65B 3/06
[52] U.S. Cl. ...................................... 141/86; 141/192; 141/198; 141/206; 141/227; 222/108; 137/312
[58] Field of Search .................. 141/86, 1, 88, 192, 141/198, 206, 227, 228, 229, 35; 137/312; 222/108

[56] References Cited

U.S. PATENT DOCUMENTS

| | | |
|---|---|---|
| 1,352,792 | 4/1920 | Day . |
| 1,992,151 | 2/1935 | Woodbridge . |
| 3,739,937 | 6/1973 | Stock ........................ 141/286 X |
| 3,927,702 | 12/1975 | Ingle ........................ 141/285 |
| 4,278,115 | 7/1981 | Briles ........................ 141/86 |
| 4,410,100 | 10/1983 | Simmons . |
| 4,593,714 | 6/1986 | Madden .................... 141/86 X |
| 4,615,362 | 8/1986 | Hartman . |
| 4,637,522 | 1/1987 | Klop . |
| 4,706,718 | 11/1987 | Milo ........................ 141/86 |
| 4,762,440 | 8/1988 | Argandona ................ 141/86 |
| 4,763,806 | 8/1988 | Pogers ........................ 141/86 |
| 4,854,469 | 8/1989 | Hargest . |
| 4,971,225 | 11/1990 | Bravo ........................ 141/86 X |
| 4,988,020 | 1/1991 | Webb ........................ 141/88 X |
| 5,016,689 | 5/1991 | McGarvey et al. ........ 141/198 |
| 5,088,530 | 2/1992 | Harp ........................ 141/86 |
| 5,186,222 | 2/1993 | Brand ........................ 141/86 |

OTHER PUBLICATIONS

705 Flex Catch brochure, E. R. W. of Muskegon, Mich.
The Container brochure, Wigdahl, Gore S. Associates of Fairbanks, Ak.

Primary Examiner—Ernest G. Cusick
Attorney, Agent, or Firm—Graybeal Jackson Haley & Johnson

[57] ABSTRACT

A liquid spillage control apparatus is disclosed having a liquid holding chamber divided by a partition into a liquid transfer portion and a liquid retaining portion. A liquid spill transfer pipe connects the fuel holding chamber with a liquid tank. Overflow liquid passe through the liquid spill transfer pipe and the liquid transfer portion, over the partition and into the liquid retaining portion of the liquid holding chamber. An opening in the liquid holding chamber is connected by a line to an opening in a liquid fill nozzle. Liquid in the liquid holding chamber of a predetermined amount passes from the liquid holding chamber, through the line, and into the liquid fill nozzle to actuate the liquid sensor of the automatic liquid shut-off mechanism of the nozzle in order to terminate liquid flow from the nozzle into the liquid tank.

34 Claims, 11 Drawing Sheets

FUEL TANK WITH FILL PIPE

FUEL SPILLAGE CONTROL APPARATUS

This application is a continuation-in-part of U.S. patent application Ser. No. 08/010,080 filed Jan. 28, 1993 now U.S. Pat. No. 5,255,721, which is a continuation-in-part of U.S. patent application Ser. No. 07/638,322 filed on Jan. 7, 1991 and issued as U.S. Pat. No. 5,186,222 on Feb. 16, 1993 and which is also a continuation-in-part of PCT Application PCT/US92/00235 filed Jan. 7, 1992.

BACKGROUND OF THE INVENTION

The present invention generally pertains to fuel spillage control devices. Specifically, this invention pertains to an apparatus for retaining fuel within an enclosed chamber, the fuel emanating from the ventilation opening of a fuel tank.

Fuel storage units commonly employed for residential energy and heating needs include a fuel tank, a fill pipe, and a ventilation opening. To replenish the fuel in these fuel storage units, the nozzle of the filling device (a mobile fuel tanker truck or the like) is inserted into the fill pipe communicating with the fuel tank.

As the fuel tank of the fuel storage unit is filled, air is vented out of the fuel tank's vent opening. When the fuel tank is full and an automatic shut-off switch is present on the nozzle, the fuel will stop flowing out of the nozzle when the fuel fills the fuel fill pipe. However, prior to this automatic shut-off, fuel will flow out of the fuel receptacle's vent opening, thus polluting the environment.

If the nozzle of the filling device does not have an automatic shut-off switch, the fuel attendant shuts off fuel flow manually, often upon observation of the fuel flowing out of the fuel receptacle's vent opening and into the environment.

Fuel receptacles adapted to be attached to the ventilation openings of fuel tanks are generally known. However, these devices suffer from venting of fuel into the environment through their own vent openings, contamination of the fuel in the fuel tank due to dirt and water entering their vent openings, the inability to automatically return fuel in the device to the fuel tank for use, and the inability to separate contaminates from the fuel in the device prior to returning it to the fuel tank.

SUMMARY OF THE INVENTION

The present invention provides a fuel spillage control apparatus having a fuel holding chamber, a vent orifice, and a fuel spill transfer pipe. The fuel spill transfer pipe connects the fuel holding chamber to the vent pipe of a fuel tank. Overflow fuel passes through the fuel spill transfer pipe and is collected in the fuel holding chamber. The fuel spill transfer pipe inlet has a cross-sectional area less than that of the fill pipe of the fuel tank. The apparatus is adapted to be attached to the fuel tank such that the outlet of the fuel spill transfer pipe is lower than the inlet of the fill pipe so that fuel level equalization between the fuel in the fill pipe and the fuel in the fuel spill transfer pipe results in fuel flow out of the fuel spill transfer pipe, as opposed to out of the fill pipe.

In a preferred embodiment of the present invention, the outlet of the fuel spill transfer pipe is oriented at an acute angle relative to the fuel spill transfer pipe inlet, the cross-sectional area of the outlet is less than that of the inlet, and a diffuser on the end of the outlet particulates fuel passing out of the outlet.

In another preferred embodiment, a fuel drain pipe communicates with the fuel spill transfer pipe in the fuel holding chamber and drains fuel of a predetermined level or greater into the fuel tank through the fuel spill transfer pipe. The inlet of the fuel drain pipe is preferably oriented substantially perpendicularly to the outlet of the fuel drain pipe. Additionally, the cross-sectional area of the fuel drain pipe inlet is preferably less than the cross-sectional area of the fuel drain pipe outlet. A fuel-buoyant drain pipe sealing means, preferably a sphere having a cross-sectional area greater than the fuel drain pipe inlet but less than the fuel drain pipe outlet, is located within the fuel drain pipe. This fuel-buoyant drain pipe sealing means closes the fuel drain pipe during fuel flow into the fuel spill transfer pipe when the fuel level in the fuel drain pipe reaches the fuel drain pipe inlet. Fuel cannot enter either the fuel drain pipe or the fuel spill transfer pipe while the fuel-buoyant drain pipe sealing means blocks the fuel drain pipe inlet, and fuel-based contaminants settle to the bottom of the fuel holding chamber. When the fuel level in the fuel drain pipe decreases due to fuel consumption from the fuel tank, the fuel buoyant drain pipe sealing means is unseated from the inlet of the fuel drain pipe, and fuel flows through the fuel drain pipe and the fuel spill transfer pipe and into the fuel tank.

In another preferred embodiment, the liquid spillage control apparatus includes a preferably spherical liquid holding chamber connected to a liquid tank and divided into a liquid transfer portion and a liquid retaining portion by a partition. The liquid transfer portion and liquid retaining portions communicate such that liquid from the liquid tank passes from the liquid transfer portion to the liquid retaining portion, but the liquid is prevented from returning to the liquid transfer portion by the partition. A wall is provided in the liquid transfer portion for liquid to pass from the liquid transfer portion, over the partition, and into the liquid retaining portion whereby the liquid deflects off of this wall and is diffused. Preferably, the liquid holding chamber has a top portion engaged by a pressure release clasp such that the top portion disengages from the liquid holding portion at a predetermined internal pressure.

In another preferred embodiment, an opening in the liquid holding chamber is connected by a line to an opening in a liquid fill nozzle. Liquid in the liquid holding chamber of a predetermined amount passes from the liquid holding chamber, through the line, and into the liquid fill nozzle to actuate the liquid sensor of the automatic liquid shut-off mechanism of the nozzle in order to terminate liquid flow from the nozzle into the liquid tank.

BRIEF DESCRIPTION OF THE DRAWINGS

These and other features of the present invention will be more fully appreciated when considered in light of the following specification and drawings in which.

DETAILED DESCRIPTION OF THE PREFERRED EMBODIMENT

The present invention is a fuel spillage control apparatus adapted to be attached to the ventilation opening or pipe of a fuel tank that also has a fill pipe.

Figure 1:
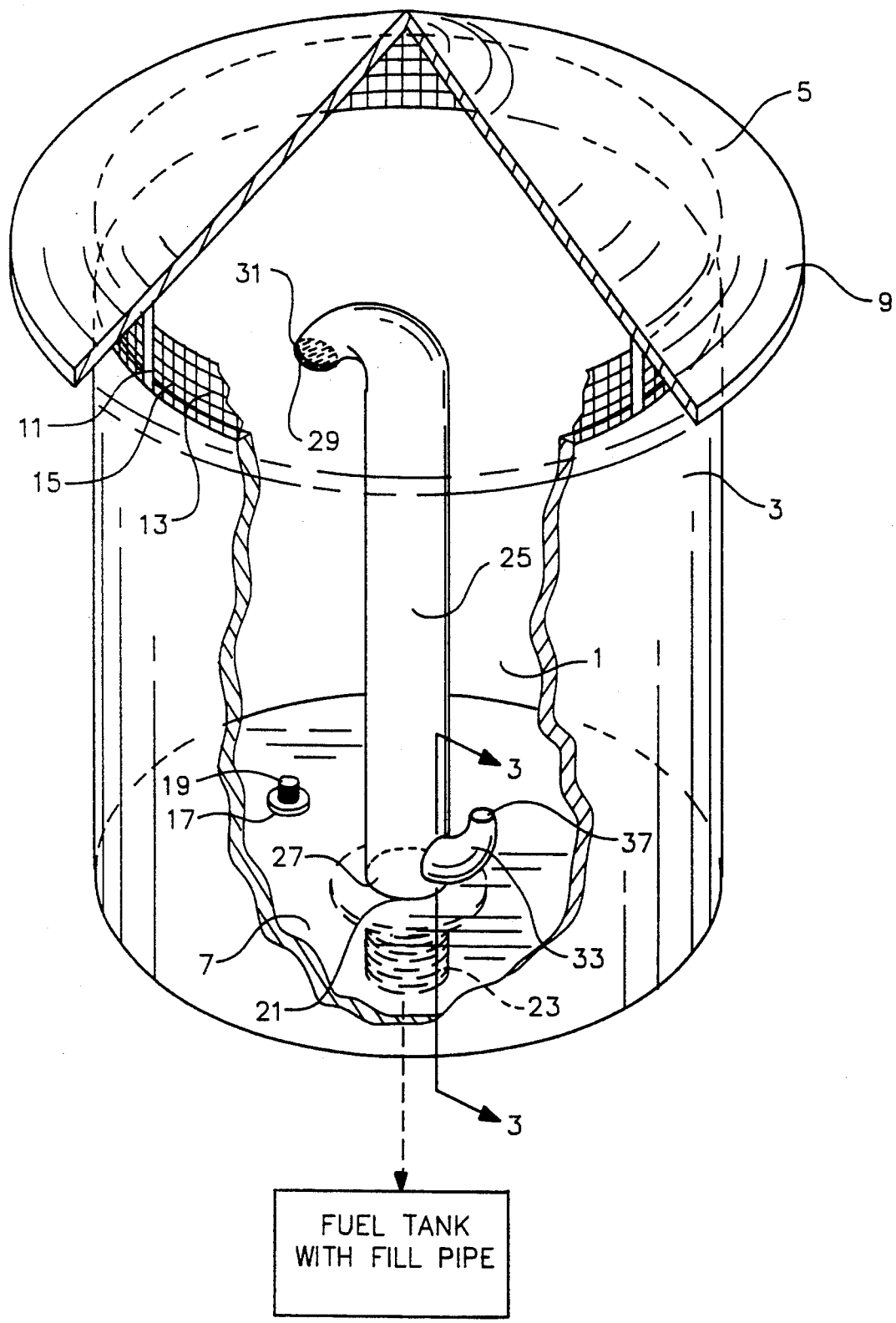
FIG. 1 is an isometric view of a first embodiment of the present invention.
Figure 2:
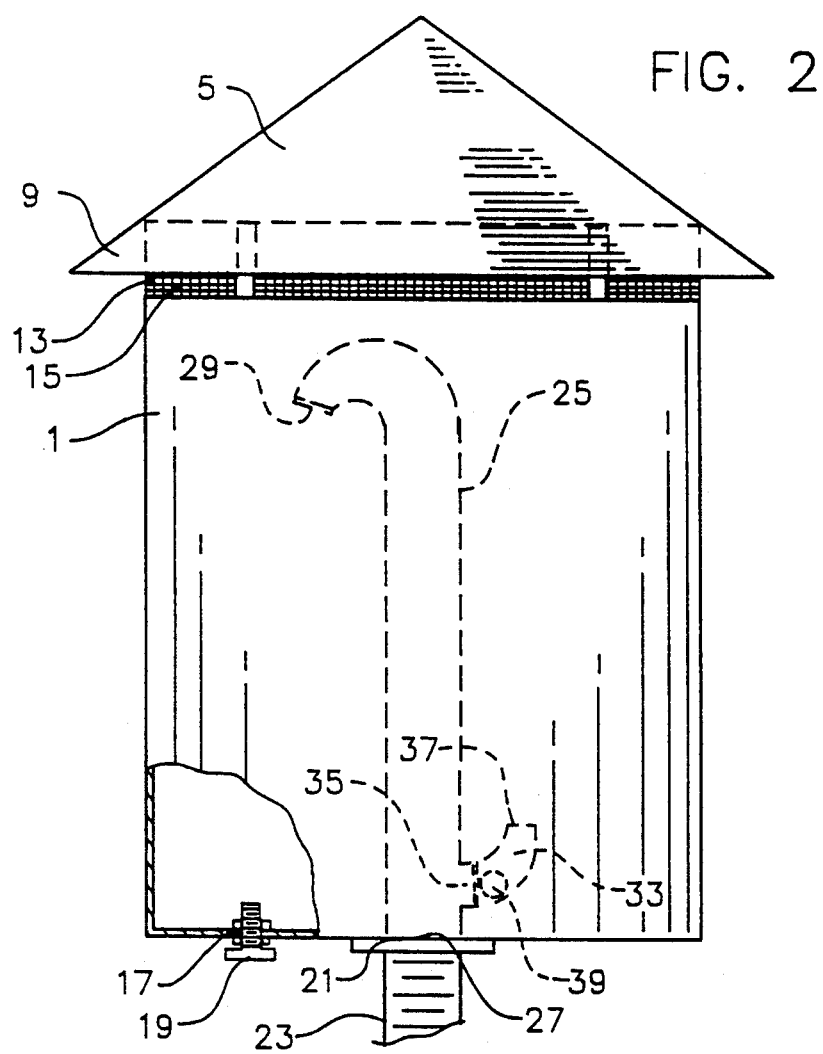
FIG. 2 is a cross-sectional view of the first embodiment of FIG. 1 taken along line 2—2.

Referring to FIGS. 1 and 2, the fuel spillage control apparatus of the present invention includes fuel holding chamber 1 having sides 3, top 5, and bottom 7. Fuel holding chamber 1 may be made out of any durable, non-corrosive material such as steel or plastic. Fuel holding chamber 1 is shown in a cylindrical embodiment, but it may also be square or rectangular, for example. Top 5 of fuel holding chamber 1 is preferably sloped (for example, a conical structure) and has eaves 9 extending over the sides 3 to facilitate the drainage of rain and other moisture off of the exterior of fuel holding chamber 1. Top 5 is preferably attached to sides 3 by a plurality of rods 11 welded, screwed, bolted or riveted to top 5 and sides 3.

Vent opening 13 is preferably an annular space between top 5 and sides 3 of fuel holding chamber 1. Vent opening 13 allows displaced fuel vapor to escape fuel holding chamber 1 as the fuel tank is filled with fuel, thus preventing a pressure build-up in fuel holding chamber 1.

Mesh 15 is located over vent opening 13 and prevents external solid contaminants from entering fuel holding chamber 1. Mesh 15 is preferably comprised of steel wire and is attached to top 5 and sides 3 with adhesives or by welding.

Contaminant drain opening 17 is located in bottom 7 of fuel holding chamber 1. Plug 19 seals contaminant drain opening 17. Upon removal of plug 19, liquid or solid fuel contaminants that have settled out of fuel in fuel holding chamber 1 are drained through drain opening 17 to minimize the contaminants in fuel returned to the fuel tank from fuel holding chamber 1.

Bottom 7 of fuel holding chamber 1 also includes fuel spill opening 21. Fuel holding chamber 1 is connected in a fluid-tight manner to the vent pipe 23 of the fuel tank at fuel spill opening 21, preferably through threaded attachment or by welding.

The cross-sectional area of fuel spill opening 21 is less than the cross-sectional area of the fill pipe of the fuel tank so that, when the fuel tank is full, fuel will flow up into the fill pipe, thus triggering the automatic shut-off switch of the fuel fill nozzle if present. If the cross-sectional area of fuel spill opening 21 is greater than that of the fill pipe, fuel will not flow up into the fill pipe and trigger the shut-off switch when the fuel tank is full, but will instead flow through fuel spill opening 21, filling fuel holding chamber 1 and spilling through vent opening 13 into the external environment. For optimum functioning, fuel spill opening 21 should have a cross-sectional area between 40% to 60% less than the cross-sectional area of the fill pipe. However, the present invention will function as long as the cross-sectional area of fuel spill opening 21 is less than that of the fill pipe. In the most preferred embodiment, fuel spill opening 21 has a diameter of 1½ inches when the fill pipe has a diameter of 2 inches. Preferably, the diameter of fuel spill opening 21 (and of inlet 27 and outlet 29 of fuel transfer pipe 25, discussed below) should not be less than 1½ inches or excessive vapor back pressure will occur as fuel fills the fuel tank at an average rate of 60 gallons per minute.

Fuel spill transfer pipe 25 is connected to fuel spill opening 21 in a fluid-tight manner, preferably by welding or adhesive. Overflow fuel from the vent pipe of the fuel tank passes through fuel spill opening 21 and fuel spill transfer pipe 25, and into fuel holding chamber 1. The inlet 27 of fuel spill transfer pipe 25 is preferably sized to match the cross-sectional area of fuel spill opening 21 (i.e., less than the cross-sectional area of the fill pipe). The outlet 29 of fuel spill transfer pipe 25 preferably has a cross-sectional area less than that of inlet 27 and fuel spill opening 21. In the preferred embodiment, the cross-sectional area of outlet 29 is between 40% to 60%, and most preferably is 44%, of the cross-sectional area of the fill pipe of the fuel tank.

In an alternate embodiment of the present invention, the cross-sectional area of either one of fuel spill opening 21 or the inlet 27 of fuel spill transfer pipe 25 is less than that of the fill pipe (preferably 40%–60% less, most preferably 44% less), but the cross-sectional area of outlet 29 of fuel spill transfer pipe 25 is not necessarily less than the cross-sectional areas of inlet 27 and fuel spill opening 21.

In yet another alternate embodiment of the present inventions, the cross-sectional area of outlet 29 of fuel spill transfer pipe 27 is less than that of the fill pipe (preferably 40%–60% less, most preferably 44% less), but the cross-sectional area of inlet 27 of fuel spill transfer pipe 25 and of fuel spill opening 21 are not necessarily less than the cross-sectional area of the fill pipe.

In sum, as long as one of the fuel spill opening 21, the inlet 27 of fuel transfer pipe 25, and the outlet 29 of fuel transfer pipe 25 is less than the cross-sectional area of the fill pipe (preferably 40%–60% less, most preferably 44% less), the requisite flow of fuel up into the fill pipe will occur when the fuel tank is full.

Fuel spill transfer pipe 25 is preferably curved such that outlet 29 is oriented at an acute angle relative to inlet 27. This orientation of outlet 29 guides overflow fuel passing through fuel spill transfer pipe 25 to bottom 7 of fuel holding chamber 1, thus preventing violent fuel flow from escaping through vent opening 13.

To further minimize escape of high-velocity fluid flow through vent opening 13, diffuser 31 is preferably located over outlet 29. Diffuser 31 is comprised of wire mesh or a cover plate having a plurality of minute openings. In operation, diffuser 31 separates the overflow fuel passing through outlet 29 into smaller droplets that disperse over a wider area in fuel holding chamber 1 than would a single stream of overflow fuel. These smaller droplets are less likely to escape out of vent opening 13 upon impact with fuel holding chamber 1 than is a single fuel stream.

Connected to fuel spill transfer pipe 25, adjacent to inlet 27, is fuel drain pipe 33. Fuel drain pipe 33 receives overflow fuel that has passed through fuel spill transfer pipe 25 into fuel holding chamber 1 and drains this fuel back into the fuel tank. Fuel drain pipe 33 includes outlet 35, in communication with spill transfer pipe 25, and inlet 37. Preferably, fuel drain pipe 33 is curved such that inlet 37 is oriented substantially perpendicular to outlet 35. The length of fuel drain pipe 33 is chosen to achieve a desired height of inlet 37 above bottom 7 of fuel holding chamber 1. The height of inlet 37 above bottom 7 dictates the fuel amount (below the fuel inlet 37) that is drained out of contaminant drain opening 17.

Figure 3:
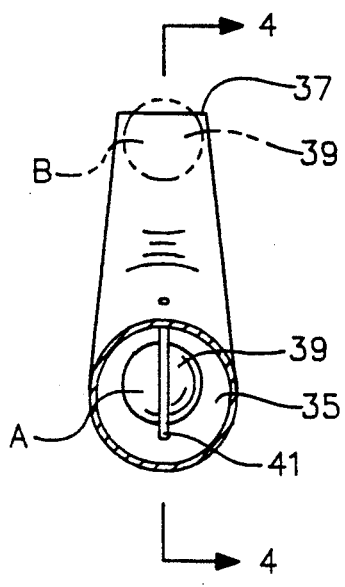
FIG. 3 is a cross-sectional view of the fuel drain pipe of the present invention taken along line 3—3 of FIG. 1.
Figure 4:
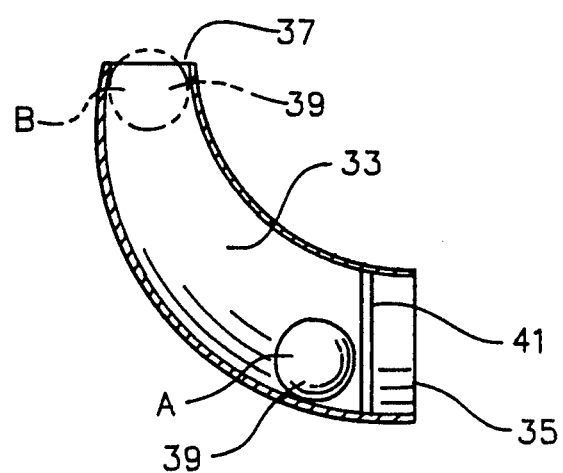
FIG. 4 is a cross-sectional view of the fuel drain pipe of the present invention taken along line 4—4 of FIG. 3.

Referring now to FIGS. 3 and 4, drain pipe sealing body 39 is located in fuel drain pipe 33. Drain pipe sealing body 39 is preferably a fuel-buoyant sphere of rubber or plastic, for example. Inlet 37 of fuel drain pipe 33 preferably has a cross-sectional area less than that of outlet 35. The diameter of drain pipe sealing body 39 is preferably less than the cross-sectional area of outlet 35 and greater than the cross-sectional area of inlet 37. Post 41 in outlet 35 retains drain pipe sealing body 39 in fuel drain pipe 33.

Thus, when no fuel is present in fuel drain pipe 33, drain pipe sealing body 39 rests against post 41 adjacent to outlet 35 (see A of FIGS. 3 and 4). When fuel fills fuel drain pipe 33 to a level substantially equal to the height of inlet 37, drain pipe sealing body 34 floats into fluid-tight engagement with inlet 37, thus sealing fuel drain pipe 33 (see B of FIGS. 3 and 4).

Referring to FIGS. 1-4, the present invention functions as follows. Attachment of the invention to the fuel tank vent pipe 23 is first described. The present invention should be attached to the vent pipe 23 such that the height of the fuel spill transfer pipe 25 and of vent pipe 23 together is less than the height of the fill pipe of the fuel tank. Preferably, the combined height of vent pipe 23 and fuel spill transfer pipe 25 should be not more than 2 feet less than the height of the fill pipe. Immediately after filling the fuel tank, fuel will also be present in the entire lengths of the fill pipe, the vent pipe 23, and the fuel spill transfer pipe 25. The two columns of fuel, one in the fill pipe and the other in the vent pipe 23 and fuel spill transfer pipe 25, will then attain equilibrium heights based on the respective pipe diameters and fuel column heights. If the fuel column height in the fuel spill transfer pipe 25 and the vent pipe 23 is less than the fuel column height in the fill pipe, then upon equilibration, fuel will flow through the fuel spill transfer pipe 25 and into fuel holding chamber 1 instead of out of the fill pipe. On the other hand, if the height of the fill pipe is less than that of the fuel spill transfer pipe 25 and vent pipe 23, fuel flow may occur through the fill pipe and into the environment as the two fuel columns attain equilibrium levels.

Operation of the present invention during the fuel filling and usage cycle of the fuel tank is next described. During filling of the fuel tank, the nozzle of the filling device is placed in the fill pipe, as described above, and fuel enters the fuel tank through the fill pipe. The air and fuel vapors in the fuel tank displaced by the fuel entering the tank pass out of vent pipe 23 through fuel spill transfer pipe 25, into fuel holding chamber 1, through vent opening 13, and into the environment.

When the fuel tank is full, fuel will enter both the fill pipe and the fuel spill transfer pipe 25. Fuel will pass out of the outlet 29 of the spill transfer pipe 25 and into fuel holding chamber 1. Fuel does not pass out of fuel drain pipe 33 because the force and the fluid level of the fuel in fuel drain pipe 33 urges drain pipe sealing body 39 into fluid-tight registration with the inlet 37 of fuel drain pipe 33. Fuel will flow through fuel spill transfer pipe 25 and collect in fuel holding chamber 1 until fuel flow into the fuel tank is terminated by manual or automatic shut-off of the fuel nozzle when the level in the fill pipe reaches the fill pipe opening. Upon fuel flow termination, as discussed above, the fuel in fuel spill transfer pipe 25 will attain an equilibrium level, presumably above the inlet 37 of fuel drain pipe 33.

After fuel flow into the fuel tank is terminated, a level of fuel will be present in fuel holding chamber 1 that is preferably higher than inlet 37 of fuel drain pipe 33, but lower than outlet 29 of fuel spill transfer pipe 25. This fuel is trapped in the fuel holding chamber 1. After a predetermined time period during which the liquid or solid contaminates in the fuel in fuel holding chamber 1 have settled, plug 19 is removed from contaminant drain opening 17 and these impurities are removed from the trapped fuel.

As fuel is withdrawn for use from the fuel tank, the level of fuel in the fuel spill transfer pipe 25 will decrease from its height above inlet 37 of fuel drain pipe 33. At this time, the fuel level in fuel drain pipe 3 will also recede below inlet 37 of drain pipe 33. The drain pipe sealing body 39 will cease to block fuel drain pipe inlet 37 as it recedes with the fluid level in fuel drain pipe 33. The trapped fuel in fuel holding chamber 1 can now enter inlet 37 of drain pipe 33, pass around drain pipe sealing body 39 (because its diameter is less than the cross-sectional area of outlet 39 of fuel drain pipe 33), enter fuel spill transfer pipe 25 at outlet 39 of fuel drain pipe 33, and re-enter the fuel tank through the vent pipe 23. Fuel will flow from fuel holding chamber 1 back into the fuel tank until the fuel level in fuel holding chamber 1 is lower than inlet 37 of fuel drain pipe 33.

Note that contaminants can be drained through contaminant drain opening 17 after the fuel level in fuel holding chamber 1 has receded below inlet 37 of fuel drain 33, plug 19 is removed from contaminant drain opening 17 and impurities in the bottom of fuel holding chamber 1 are drained from fuel holding chamber 1. Note that contaminants from the fuel trapped in fuel holding chamber 1 can also be drained through contaminant drain opening 17 before the fuel level recedes below inlet 37 of fuel drain 33.

Figure 5:
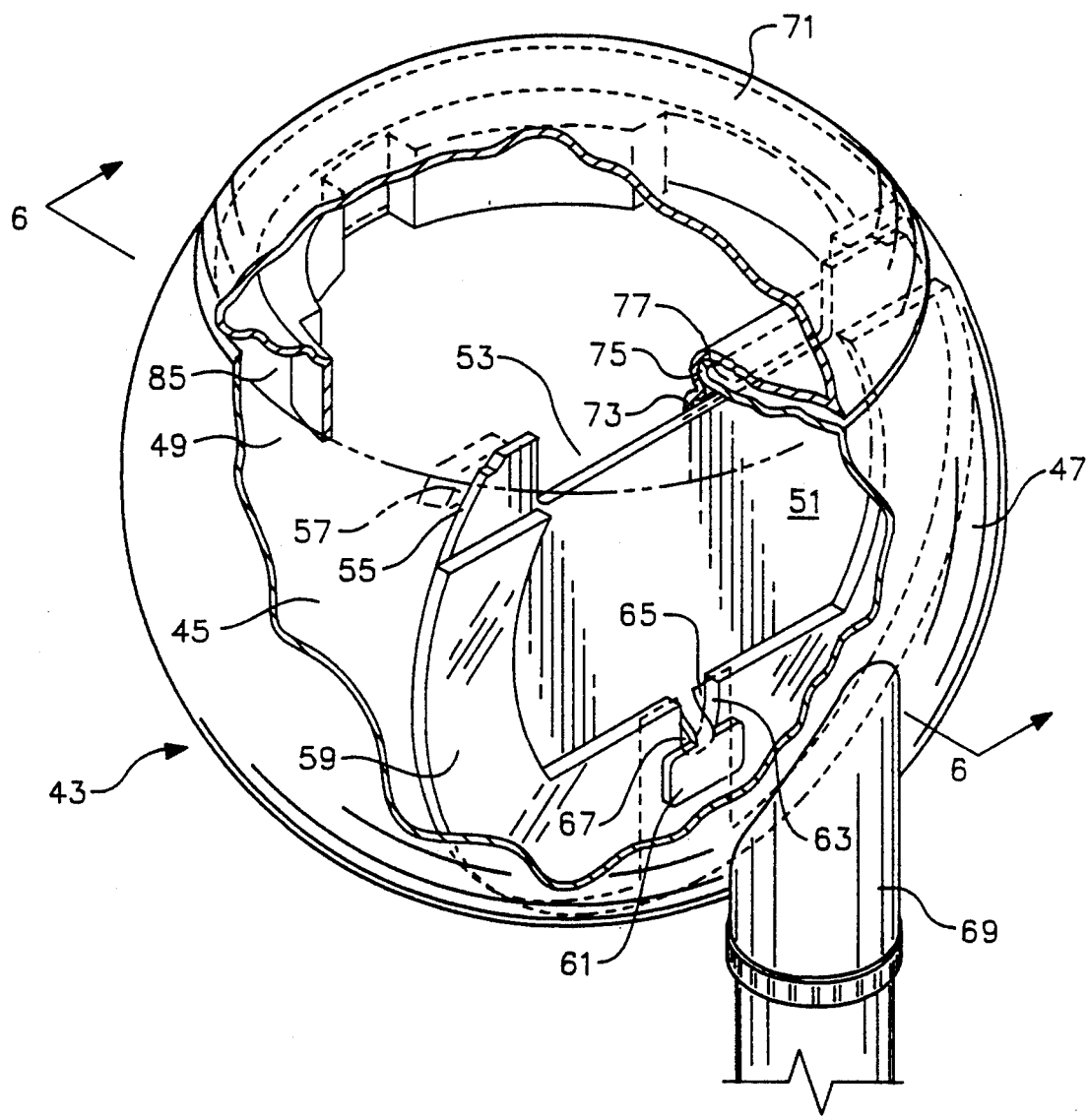
FIG. 5 is a partially exposed isometric view of a second embodiment of the present invention.
Figure 6:
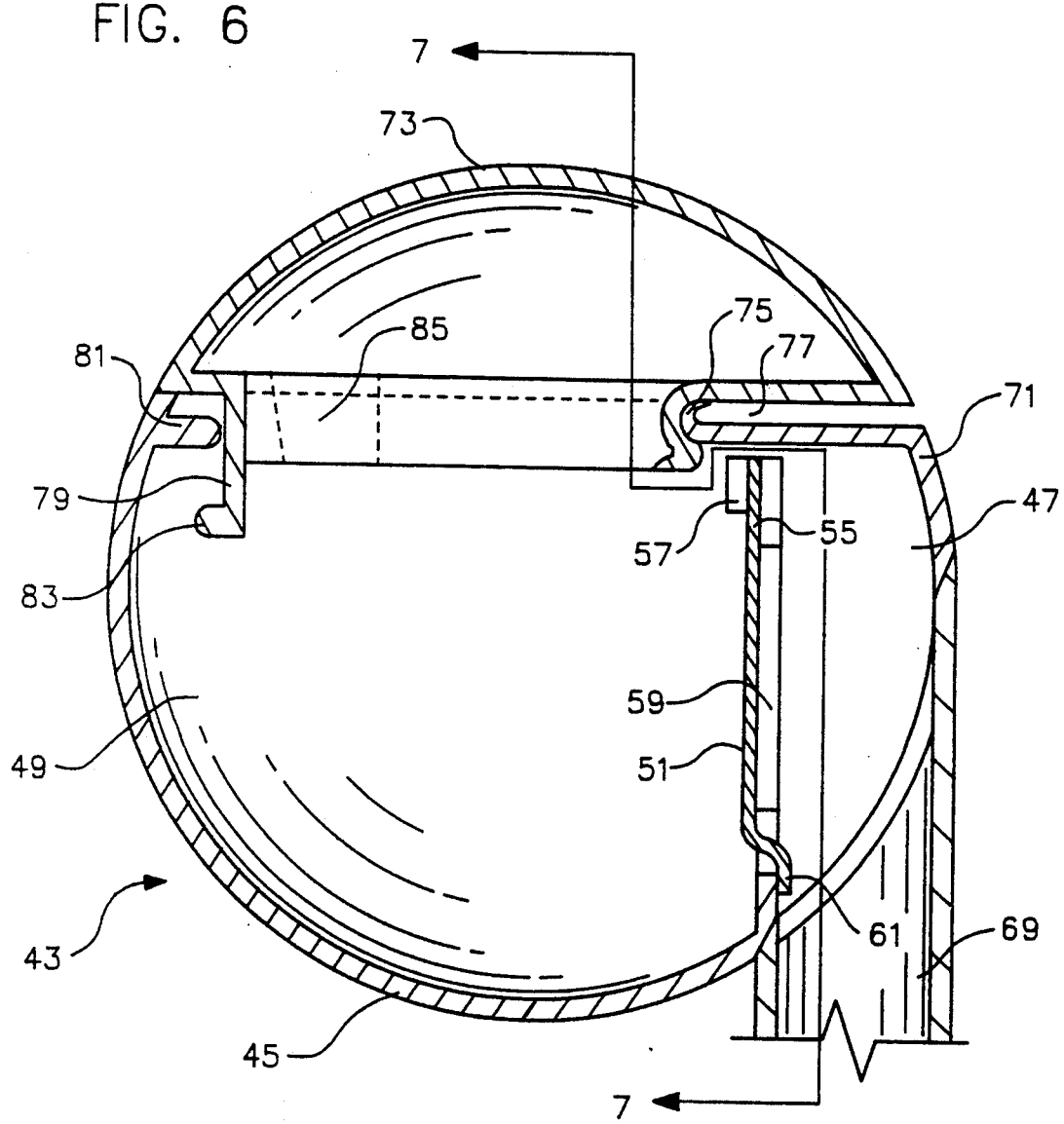
FIG. 6 is a cross-sectional view of the embodiment of FIG. 5 taken along lines 6—6.
Figure 7:
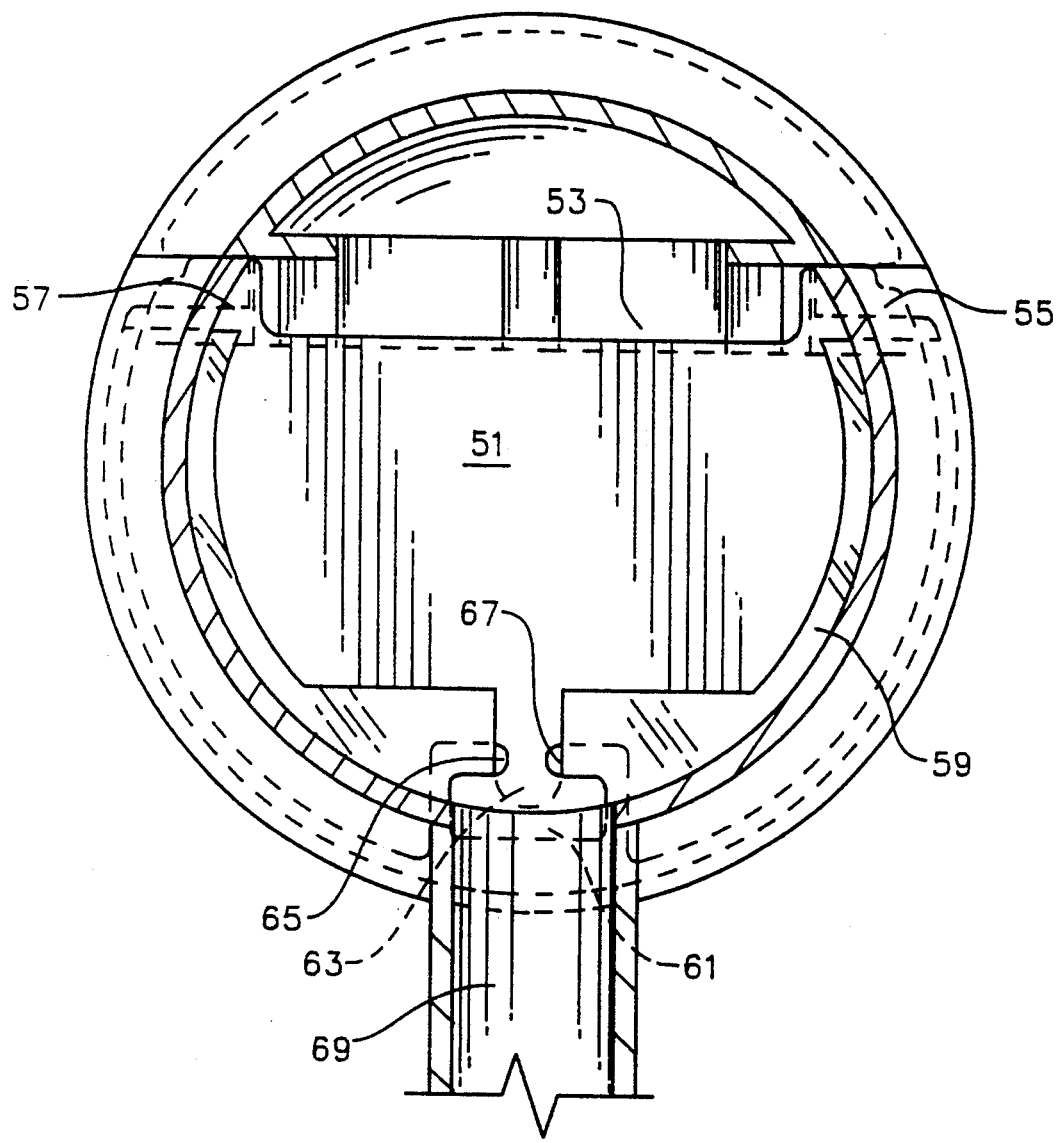
FIG. 7 is a cross-sectional view of the embodiment of FIG. 5 taken along lines 7—7 of FIG. 6.

Referring now to a second embodiment of the present invention as shown in FIGS. 5-7, this second embodiment functions to contain liquid spillage in the same manner as the first embodiment of the present invention, described above, despite certain structural differences detailed below. The liquid spillage control apparatus 43 includes a liquid holding chamber 45 that is preferably substantially spherical in shape. However, other configurations of liquid holding chamber 45 are contemplated within the scope of the present invention. Liquid spillage control apparatus 43 is preferably manufactured by blow molding or injection molding of a synthetic polymer such as, for example, polyvinyl chloride. However, it is to be understood that different methods of manufacture and different materials are encompassed within the present invention. Liquid holding chamber 45 is divided into a liquid transfer portion 47 and a liquid retaining portion 49 by partition 51 which contacts the bottom portion of liquid holding chamber 45. Partition 51 includes partition opening 53 in the upper portion thereof. Partition opening 53 allows communication between liquid transfer portion 47 and liquid retaining portion 49 of liquid holding chamber 45. Thus, partition 51 allows liquid to pass from liquid transfer portion 47 to liquid retaining portion 49 upon either violent expulsion from the liquid tank, or the gradual filling of liquid transfer portion 47 with liquid to the level of partitioning opening 53. However, partition 51 prevents liquid from flowing from liquid retaining portion 49 back into liquid transfer portion 47 until the liquid in liquid retaining portion 49 reaches the level of partition opening 53. On each side of partition opening 53 on partition 51 are upper tabs 55 which mate in seats 57 located on the upper edges of liquid holding chamber 45 such that the upper portion of partition 51 is secured in liquid holding chamber 45. To further support partition 51 in liquid holding chamber 45, liquid holding chamber 45 has a substantially u-shaped raised rib 59 therein. Partition 51 also includes lower flexible tab 61, which is bendable relative to partition 51. To attach partition 51 within liquid holding chamber 45, upper tabs 55 of partition 51 mate in seats 57 on the upper portion of liquid holding chamber 45, as stated above. Additionally, partition 41 is placed on one side of rib 59 in liquid holding chamber 45 and lower flexible tab 61 is urged onto the other side of rib 59 to brace the lower portion of partition 51 on rib 59.

A substantially u-shaped opening 63 is located on rib 59 where lower flexible tab 61 of partition 51 is attached. Additionally, slots 65 are located on each side of lower flexible tab 61 in partition 51. Thus, when flexible lower tab 61 of partition 51 is placed on rib 59, portions of u-shaped opening 63 of rib 59 and slots 65 of partition 51 overlap to form liquid return opening 67, which allows overflow fuel within the liquid retaining portion 49 of liquid holding chamber 45 to drain back into the fuel tank through liquid transfer portion 47 of liquid holding chamber 45. Preferably, u-shaped opening 63 of rib 59 is oriented at a predetermined distance above the bottom of liquid retaining portion 49 of liquid holding chamber 45 such that only liquid above a predetermined height within liquid retaining portion 49 of liquid holding chamber 45 will drain through liquid return opening 67. Thus, particulate matter and liquid contaminates having a greater density than the stored liquid will not be returned to the liquid tank.

Referring specifically now to liquid transfer portion 47, liquid transfer portion 47 communicates with drain pipe 69, which leads to the fuel tank as shown and described in the first embodiment of the present invention. Liquid transfer portion ,47 includes a wall 71 adjacent to partition 51. Wall 71 is preferably angled or curved such that liquid entering liquid transfer portion 47 from the liquid tank contacts wall 71 resulting in diffusion of the liquid into relatively fine particles, and redirection of the liquid through partition opening 53 of partition 51 and into liquid retaining portion 49 of liquid holding chamber 45.

Liquid spillage control apparatus 43 includes top 73, sized to fit thereon. Top 73 is preferably in the shape of a partial spherical section such that liquid spillage control apparatus 43 is spherical in shape when top 73 is present. The upper portion of liquid holding chamber 45 includes flange 75 adapted to mate with channel 77 of top 73 such that top 73 is pivotally attached to liquid holding chamber 45 in a hinge-like manner. Top 73 further includes lip 79 protruding downwardly thereon on the side of top 73 opposite from flange 75. Rib 81 is located on an upper inner edge of liquid holding chamber 45, and is oriented to mate with lip 79 of top 73. Lip 79 of top 73 includes protrusion 83 on an end thereof. Thus, when top 73 is attached to liquid holding chamber 45 by pressing downwardly on top 73, lip 79 of top 73, due to the flexible properties of the polymeric construction, bends inwardly as protrusion 83 of lip 79 contacts rib 81. After protrusion 83 passes rib 81, lip 79 returns to its non-bent position, thus securing top 73 onto liquid holding chamber 45. As pressure builds within liquid spillage control apparatus 43 from, for example, gas vapor from the liquid holding tank, top 73 is pivotally urged upwardly about the hinge-like interconnection of flange 75 and channel 77. This pivotal movement of top 73 continues until protrusion 83 of lip 79 of top 73 contacts rib 81 of liquid holding chamber 45, which prevents further separation of top 73 from liquid holding chamber 45. Excess pressure within liquid spillage control apparatus 43 can then be vented therefrom by openings 85, which are recesses about the inner periphery of top 73. Openings 85 also allow some venting without movement of top 73. If the pressure buildup is too great for sufficient venting to occur by the above described limited pivoting of top 73, or if the pressure buildup is quite sudden, top 73 will be urged upwardly from liquid holding chamber 45 with sufficient force to bend lip 79 of top 73 inwardly as protrusion 83 of lip 79 contacts rib 81 of liquid holding chamber 45. The closure caused by lip 79 and rib 81 is then terminated as protrusion 83 passes rib 81, thus allowing liquid holding chamber 45 to open as top 73 pivots upwardly on, or even separates from, liquid holding chamber 45 due to the pressure buildup within liquid spillage control apparatus 43.

Figure 8:
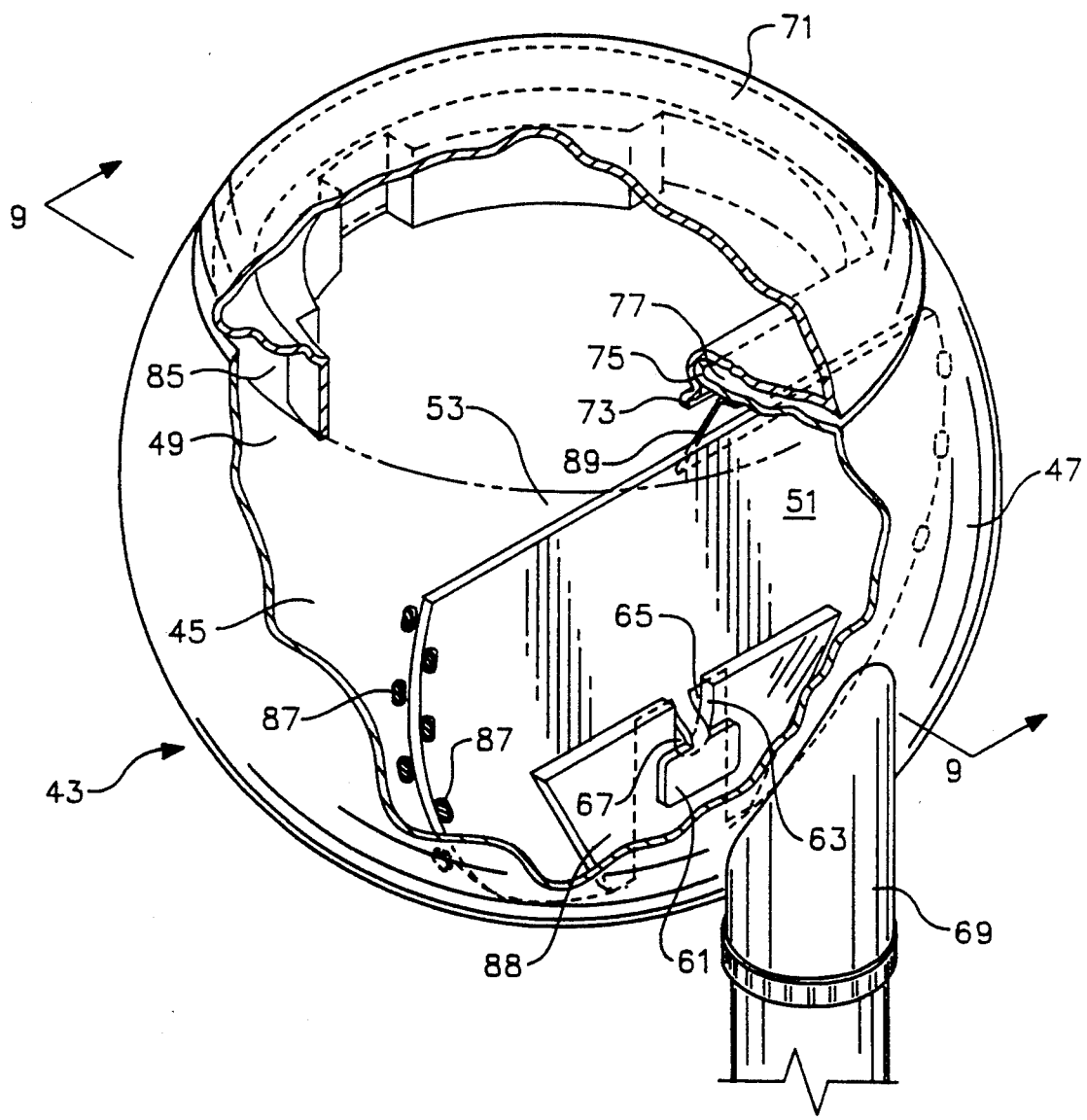
FIG. 8 is a partially exposed isometric view of a third embodiment of the present invention.
Figure 9:
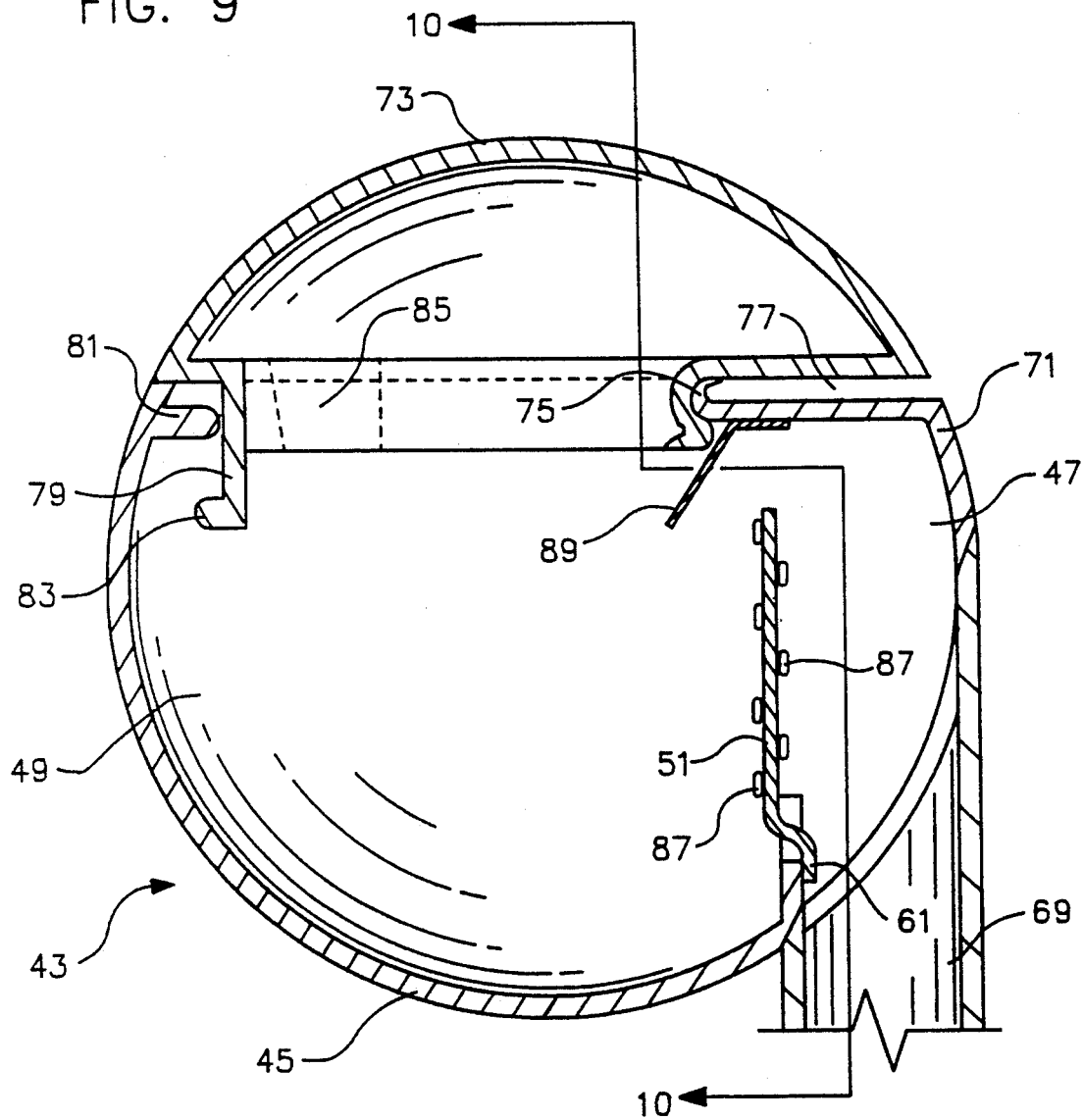
FIG. 9 is a cross-sectional view of the embodiment of FIG. 8 taken along lines 9—9.
Figure 10:
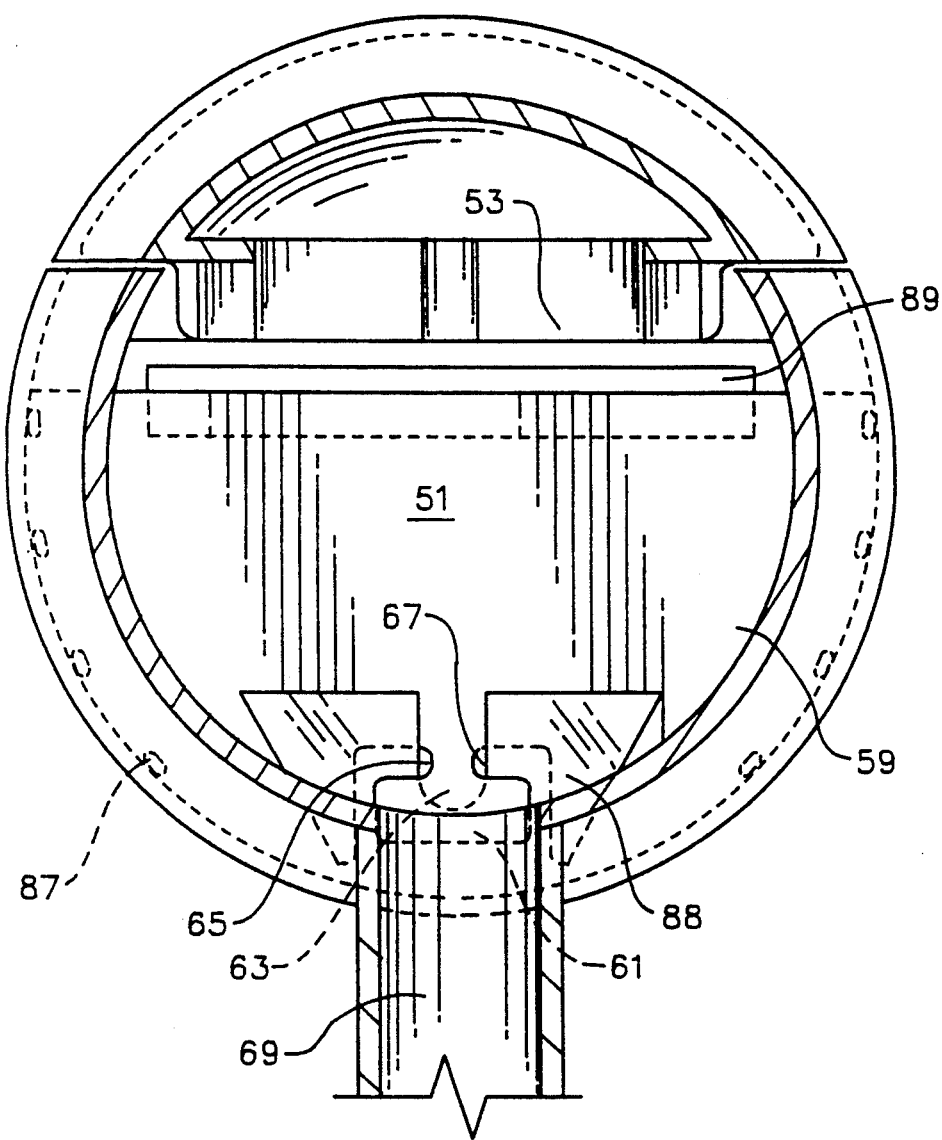
FIG. 10 is a cross-sectional view of the embodiment of FIG. 8 taken along lines 10—10 of FIG. 9.

Referring to a third embodiment of the present invention as shown in FIGS. 8, 9, and 10, it is to be understood that elements of this third embodiment having element numbers identical elements of the above described second embodiment of FIGS. 5, 6, and 7 are common elements having the same function. Specifically, the differences between the second embodiment of FIGS. 5, 6, and 7 and the third embodiment of FIGS. 8, 9, and 10 are noted below, these two embodiments being equivalent in all other respects, and the elements of the above described second embodiment that are common to the present third embodiment being expressly incorporated herein.

As shown in FIGS. 8, 9, and 10, the third embodiment of the present invention includes a liquid spillage control apparatus 43 having a liquid holding chamber 45. Liquid holding chamber 45 is divided into a liquid transfer portion 47 and a liquid retaining portion 49 by partition 51. Unlike the second embodiment described above in which partition 51 has a partition opening 53 bounded by upper tabs 55, partition 51 of the third embodiment lacks upper tabs 55, and thus defines a partition opening 53 in liquid holding chamber 55 which is equal to the width of partition 51. Because the upper tabs 55 of the second embodiment are not present in this third embodiment, the seats 57 adapted to mate therewith are also not present in this third embodiment. Instead of rib 59 in liquid holding chamber 45 of the second embodiment, the third embodiment includes a plurality of off-set protrusions 87 in place thereof. These staggered protrusions 87 are preferably lozenge shaped in cross-section and are oriented within liquid holding chamber 45 such that flexible partition 51 can be bent slightly to be braced therebetween. Because rib 59 is not present in this third embodiment, tab support 88 is instead located in place thereof in the lower portion of liquid holding chamber such that lower flexible tab 61 can be urged onto tab support 88 in order to further brace partition 51. Substantially u-shaped opening 63 is present in tab support 88 a the point of connection of lower flexible tab 61 therewith such that the intersection of substantially u-shaped opening 63 and slots 65 of partition 51 define liquid return opening 67.

As in the above described second embodiment, the third embodiment of the present invention includes wall 71 in liquid retaining portion 49 which diffuses liquid and deflects this liquid past partition 51 and into liquid retaining portion 49 of liquid holding chamber 45. But additionally, the third embodiment of the present invention may also include plate 89 oriented at an angle and adjacent partition opening 53 of partition 51 such that liquid that contacts wall 71 is deflected therefrom onto plate 89, and from plate 89 into liquid retaining portion 49 of liquid holding chamber 45. Thus, plate 89 further ensures that liquid is guided into the bottom of liquid retaining portion 49, and minimizes the possibility of liquid leakage from liquid spillage control apparatus 43 because plate 89 blocks liquid access to the hinge-like connection of flange 75 of liquid holding chamber 45 and channel 77 of top 73.

Figure 11:
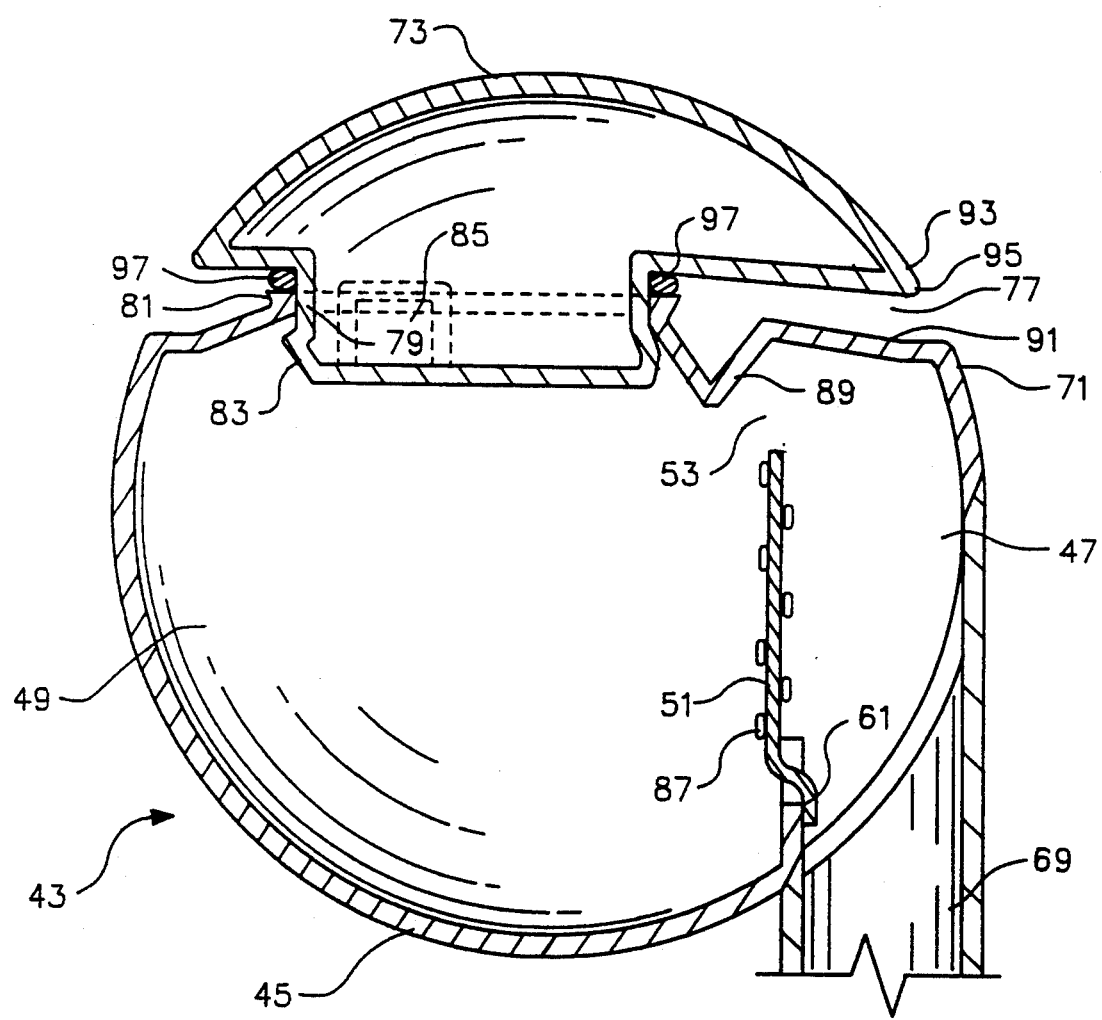
FIG. 11 is a cross-sectional view of a fourth embodiment of the present invention taken from the same perspective as FIG. 9.

Referring to a fourth embodiment of the present invention as shown in FIG. 11, it is to be understood that elements of this fourth embodiment having element numbers identical to elements of the above described third embodiment of FIGS. 8, 9, and 10 are common elements having the same function. Specifically, the difference between the third embodiment of FIGS. 8, 9, and 10 and the fourth embodiment of FIG. 11 are noted below, these two embodiments being equivalent in all other respects, and the elements of the above described third embodiment that are common to the present fourth embodiment being expressly incorporated herein.

As shown in FIG. 11, the fourth embodiment of the present invention includes a liquid spillage control apparatus 43 having a liquid holding chamber 45. Liquid holding chamber 45 is divided into a liquid transfer portion 47 and a liquid retaining portion 49 by partition 51. As in the third embodiment, the present fourth embodiment may include plate 89 oriented at an angle adjacent partition opening 53 of partition 51 such that liquid that contacts wall 71 is deflected therefrom onto plate 89, and from plate 89 into liquid retaining portion 49 of liquid holding chamber 45. However, unlike the third embodiment, plate 89 of the fourth embodiment is preferably integral with upper edge 91 of liquid holding chamber 45.

Top 73 of the fourth embodiment of the present invention preferably includes lower border 93 having eaves 95 projecting outwardly, and angled downwardly therefrom. Upper edge 91 of liquid holding chamber 45 is also sloped at substantially the same angle as eaves 95 of top 73. Thus, eaves 95 of top 73 and sloped upper edge 91 of liquid holding chamber 45 both function to channel liquid present in the external environment, such as precipitation, away from the opening of liquid holding chamber 45 over which top 73 is located.

Gasket 97 is preferably located between top 73 and upper edge 91 of liquid holding chamber 45 such that a substantially vapor-tight and liquid-tight seal is present. Gasket 97 thus prevents the passage of liquid or noxious vapor from liquid holding chamber 45 into the external environment, and is specifically useful when liquid spillage control apparatus 43 is attached to either a fuel tank or a septic tank. Alternatively, a substantially vapor-tight and liquid-tight seal between top 73 and liquid holding chamber 45 can be accomplished by a precise fit of top 73 in liquid holding chamber 45, without the presence of gasket 97.

Figure 12:
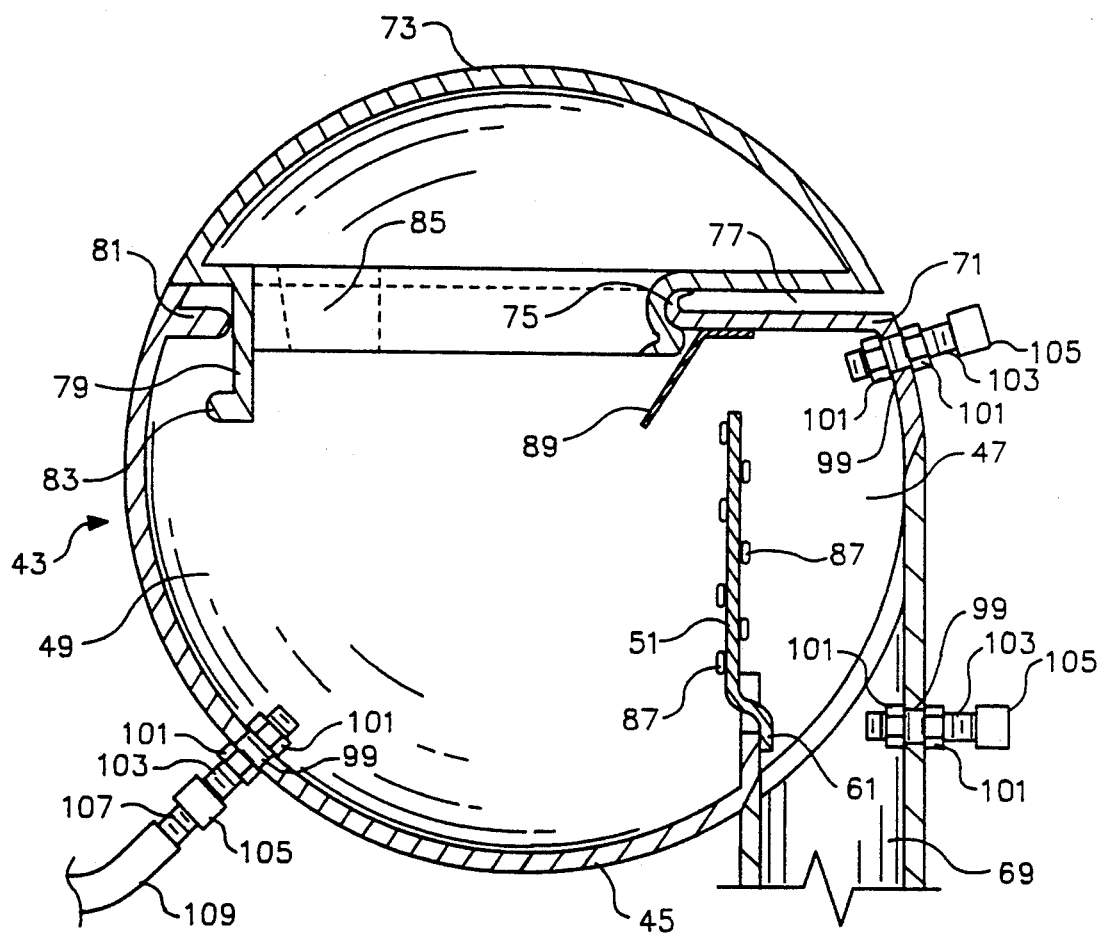
FIG. 12 is a cross-sectional view of the liquid holding chamber of a fifth embodiment of the present invention taken from the same perspective as FIG. 9.
Figure 13:
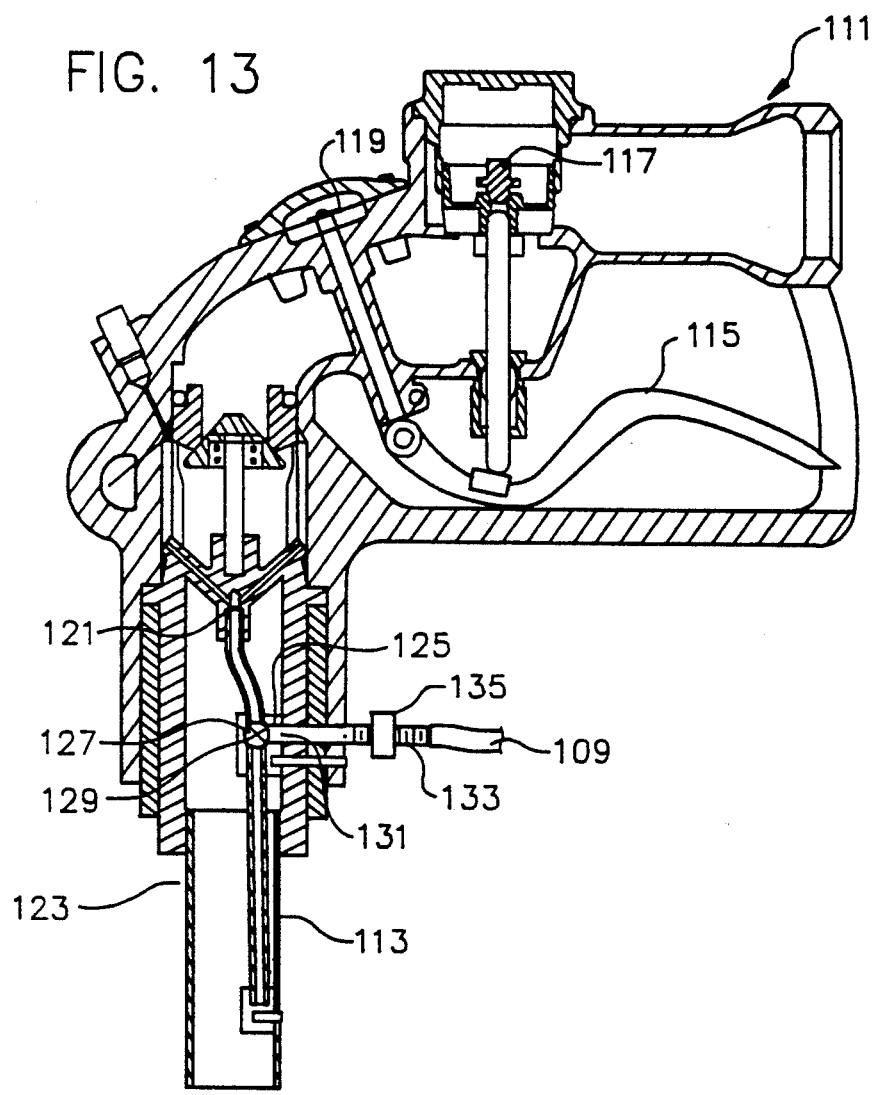
FIG. 13 is an exposed view of the liquid fill nozzle of the fifth embodiment of the present invention.

Referring to a fifth embodiment of the present invention as shown in FIGS. 12 and 13, it is to be understood that elements of this fifth embodiment having element numbers identical to elements of the above described third and fourth embodiments of FIGS. 8 through 11 are common elements having the same function. As shown in FIG. 12, liquid holding chamber 45 of liquid spillage control apparatus 43 includes an opening 99 in the wall thereof. Threaded nuts 101 securely hold threaded sleeve 103 in opening 99. Threaded sleeve 103 includes threaded cap 105, which is adapted to connect threaded sleeve 103 with the threaded end 107 of fluid line 109. As shown in FIG. 12, opening 99, and attached fluid line 109 can be located in any of the shown positions, or, additionally, can be located in any position on liquid holding chamber 45 such that liquid of a predetermined level can pass from liquid holding chamber 45 through opening 99, through threaded sleeve 103 and through fluid line 109 into the liquid fill nozzle shown in detail in FIG. 13.

Referring to FIG. 13, liquid fill nozzle 111 is of a design well known in the art, and can be one of the type manufactured by Dover Corporation, OPI Division, P.O. Box 405003, 9393 Princeton-Glendale Road, Cincinnati, Ohio, 45240-5003. More specifically, liquid fill nozzle 111 includes spout 113 and lever 115. Actuation of lever 115 actuates poppet 117 and diaphragm 119 to pass liquid from a liquid source (not shown) through liquid fill nozzle 111 in a manner well known in the art. Automatic liquid shut-off mechanism 121 includes a liquid sensor which is preferably a Venturi type liquid sensor known in the art. Primary sensor line 123 emanates from automatic liquid shut-off mechanism 121 and terminates in spout 113. Secondary sensor line 125 intersects primary sensor line 123. Switch valve 127 is located at the point of intersection of primary sensor line 123 and secondary sensor line 125. Switch valve 127 is a switching mechanism known in the art which provides alternate liquid communication of primary sensor line 123 and secondary sensor line 125 with automatic liquid shut-off mechanism 121. Orientation of switch 129 of switch valve 127 between a first and a second position determines which of primary sensor line 123 and secondary sensor line 125 communicates with automatic liquid shut-off mechanism 121.

Secondary sensor line 125 communicates with opening 131 in nozzle 111. Opening 131 can be either in nozzle 111 proper, or in spout 113 of nozzle 111. Opening 131 is preferably threaded such that threaded end 133 of fluid line 109 can be secured in opening 131. Threaded cap 135 on threaded end 133 of fluid line 109 facilitates attachment of fluid line 109 to secondary sensor line 125 through opening 131.

In operation, when switch 129 of switch valve 127 is oriented in a first position, secondary sensor line 125 does not communicate with automatic liquid shut-off mechanism 121, and primary sensor line 123 in nozzle 113 does communicate with automatic liquid shut-off mechanism 121 such that automatic liquid shut-off occurs during conventional use of nozzle 111 as liquid from the fill pipe of the liquid tank flows into nozzle 113 and primary sensor line 123 as the liquid tank is filled. However, when nozzle 111 is to be used in conjunction with liquid holding chamber 45, and nozzle 111 is attached to liquid holding chamber 45 by fluid line 109, switch 129 of switch valve 127 is oriented in the second position to allow communication of automatic liquid shut-off mechanism 121 with secondary sensor line 125 instead of with primary sensor line 123. In this configuration, liquid in liquid holding chamber 45 of a predetermined amount passes from liquid holding chamber 45 through opening 99, through fluid line 109, into opening 131 and through secondary sensor line 125 to actuate the liquid sensor of automatic liquid shut-off mechanism 121 to terminate liquid flow through nozzle 111 from the liquid source. It is thus readily apparent that nozzle 111 can be used for conventional filling of a fluid tank when primary sensor line 123 communicates with automatic liquid shut-off mechanism 121, and can also be used in conjunction with liquid holding chamber 45 when secondary sensor line 125 is in communication with automatic liquid shut-off mechanism 121.

While particular embodiments of the present invention have been described in some detail herein above, changes and modifications may be made in the illustrated embodiments without departing from the spirit of the invention.

I claim:

1. A liquid spillage control apparatus adapted to be connected to a liquid tank having a ventilation opening and a fill pipe and adapted to be connected to a liquid fill nozzle having an automatic liquid shut-off mechanism with at least one liquid sensor, and an opening in the nozzle, said liquid spillage control apparatus comprising:
    a liquid holding chamber adapted to be connected to the ventilation opening of the liquid tank;
    means for causing excess liquid from the liquid tank ventilation opening to enter said liquid holding chamber and for preventing the excess liquid from returning to the liquid tank; and
    means for connecting said liquid holding chamber to the opening in the liquid fill nozzle whereby liquid in said liquid holding chamber of a predetermined amount passes from said liquid holding chamber into the liquid fill nozzle to actuate the liquid sensor of the automatic liquid shut-off mechanism of the nozzle.

2. The apparatus of claim 1 further comprising:
    a partition contacting the bottom of said liquid holding chamber and dividing said liquid holding chamber into a liquid transfer portion and a liquid retaining portion, said liquid transfer portion communicating with said liquid retaining portion whereby liquid from the liquid tank passes from said liquid transfer portion to said liquid retaining portion of said liquid holding chamber and is prevented from returning to said liquid transfer portion by said partition.

3. The apparatus of claim 1 wherein said liquid holding chamber is substantially spherical.

4. The apparatus of claim 1 further comprising:
    a liquid return means communicating with said liquid holding portion and with said liquid transfer portion of said liquid holding chamber so that liquid having greater than a predetermined level within said liquid holding portion of said liquid holding chamber drains into the liquid tank through said liquid return means and said liquid transfer portion.

5. The apparatus of claim 4 wherein said liquid return means is an opening in said partition.

6. The apparatus of claim 1 wherein said liquid transfer portion of said liquid holding chamber has a wall oriented to diffuse liquid from the liquid tan and direct the liquid past said partition and into said liquid retaining portion of said liquid holding chamber.

7. The apparatus of claim 6 further comprising:
    a plate oriented with respect to said wall of said liquid transfer portion to direct liquid contacting said wall into said liquid retaining portion of said liquid holding chamber.

8. The apparatus of claim 7 wherein said plate is integral with said liquid holding chamber.

9. The apparatus of claim 1 further comprising:
    a top portion on said liquid holding chamber; and
    pressure release means engaging said top portion to said liquid holding chamber whereby at a predetermined pressure within said liquid holding chamber said pressure release means disengages said top portion from said liquid holding chamber.

10. The apparatus of claim 1 further comprising:
    a top portion on said liquid holding chamber; and
    seal means between said top portion and said liquid holding chamber, said seal means preventing liquid and vapor from escaping said liquid holding chamber.

11. The apparatus of claim 10 wherein said seal means is a gasket circumferentially disposed between said top portion and said liquid holding chamber.

12. The apparatus of claim 1 further comprising:
    a top portion on said liquid holding chamber, said top portion having a lower border with projecting eaves thereon.

13. The apparatus of claim 12 wherein said liquid holding chamber has a sloped upper edge adjacent said top portion.

14. The apparatus of claim 1 wherein said means for connecting said liquid holding chamber to the opening in the liquid fill nozzle is an opening in said liquid holding chamber and a line connecting said opening in said liquid holding chamber to the opening in the liquid fill nozzle.

15. A liquid spillage control and liquid filling apparatus for a liquid tank with a ventilation opening and a fill pipe, comprising:
    a liquid fill nozzle adapted to be connected to a liquid source and to fill the liquid tank through the fill pipe, said liquid fill nozzle having an automatic liquid shut-off mechanism with at least one liquid sensor, and an opening in said nozzle;
    a liquid holding chamber adapted to be connected to the ventilation opening of the liquid tank;
    means for causing excess liquid from the liquid tank ventilation opening to enter said liquid holding chamber and for preventing the excess liquid from returning to the liquid tank; and
    means for connecting said liquid holding chamber to said opening in said liquid fill nozzle whereby liquid in said liquid holding chamber of a predetermined amount passes from said liquid holding chamber into said liquid fill nozzle to actuate said at least one liquid sensor of the automatic liquid shut-off mechanism of said nozzle.

16. The apparatus of claim 15 wherein said means for connecting said liquid holding chamber to said opening in said liquid fill nozzle is an opening in said liquid holding chamber and a line connecting said opening in said liquid holding chamber to the opening in the liquid fill nozzle.

17. The apparatus of claim 15 further comprising:
a spout attached to said liquid fill nozzle, said spout having a first liquid sensor in communication with said automatic liquid shut-off mechanism; and
a second liquid sensor in communication with said opening in said liquid fill nozzle that connects said liquid fill nozzle and said liquid holding chamber and in communication with said automatic liquid shut-off mechanism said first liquid sensor and said second liquid sensor comprising said at least one liquid sensor of said liquid fill nozzle.

18. The apparatus of claim 17 further comprising:
a switch means for selectively communicating one of said first liquid sensor and said second liquid sensor with said automatic liquid shut-off mechanism.

19. The apparatus of claim 15 further comprising:
a partition contacting said bottom of said liquid holding chamber and dividing said liquid holding chamber into a liquid transfer portion and a liquid retaining portion, said liquid transfer portion communicating with said liquid retaining portion whereby liquid from the liquid tank passes from said liquid transfer portion to said liquid retaining portion of said liquid holding chamber and is prevented from returning to said liquid transfer portion by said partition.

20. The apparatus of claim 15 wherein said liquid holding chamber is substantially spherical.

21. The apparatus of claim 19 further comprising:
a liquid return means communicating with said liquid holding portion and with said liquid transfer portion of said liquid holding chamber so that liquid having greater than a predetermined level within said liquid holding portion of said liquid holding chamber drains into the liquid tank through said liquid return means and said liquid transfer portion.

22. The apparatus of claim 21 wherein said liquid return means is an opening in said partition.

23. The apparatus of claim 19 wherein said liquid transfer portion of said liquid holding chamber has a wall oriented to diffuse liquid from the liquid tank an direct the liquid past said partition and into said liquid retaining portion of said liquid holding chamber.

24. The apparatus of claim 19 further comprising:
a plate oriented with respect to said wall of said liquid transfer portion to direct liquid contacting said wall into said liquid retaining portion of said liquid holding chamber.

25. The apparatus of claim 24 wherein said plate is integral with said liquid holding chamber.

26. The apparatus of claim 15 further comprising:
a top portion on said liquid holding chamber; and
pressure release means engaging said top portion to said liquid holding chamber whereby at a predetermined pressure within said liquid holding chamber said pressure release means disengages said top portion from said liquid holding chamber.

27. The apparatus of claim 15 further comprising:
a top portion on said liquid holding chamber; and
seal means between said top portion and said liquid holding chamber, said seal means preventing liquid and vapor from escaping said liquid holding chamber.

28. The apparatus of claim 27 wherein said seal means is a gasket circumferentially disposed between said top portion and said liquid holding chamber.

29. The apparatus of claim 15 further comprising:
a top portion on said liquid holding chamber, said top portion having a lower border with projecting eaves thereon.

30. The apparatus of claim 29 wherein said liquid holding chamber has a sloped upper edge adjacent said top portion.

31. A liquid fill apparatus for a liquid tank with a fill pipe, a ventilation opening, and a liquid holding chamber on the ventilation opening for holding excess liquid from the liquid tank, said liquid fill apparatus comprising:
a liquid fill nozzle adapted to be connected to a liquid source and to fill the liquid tank through the fill pipe, said liquid fill nozzle having an opening therein; and
an automatic liquid shut-off mechanism having at least one liquid sensor, said liquid fill nozzle adapted to be connected to the liquid holding chamber through said opening in said nozzle whereby liquid in the liquid holding chamber of a predetermined amount passes from the liquid holding chamber through said opening and into said liquid fill nozzle to actuate said liquid sensor of said automatic liquid shut-off mechanism to terminate liquid flow through said liquid fill nozzle.

32. The apparatus of claim 31 further comprising:
means for connecting said liquid holding chamber to said opening in said liquid fill nozzle comprising an opening in liquid holding chamber and a line connecting the opening in the liquid holding chamber to said opening in the said liquid fill nozzle.

33. The apparatus of claim 31 further comprising:
a spout attached to said liquid fill nozzle, said spout having a first liquid sensor in communication with said automatic liquid shut-off mechanism; and
a second liquid sensor in communication with said opening in said liquid fill nozzle that connects said liquid fill nozzle and said liquid holding chamber and in communication with said automatic liquid shut-off mechanism.

34. The apparatus of claim 33 further comprising:
switch means for selectively communicating one said first liquid sensor and said second liquid sensor with said automatic liquid shut-off mechanism.

* * * * *